United States Patent [19]
Tanaka et al.

[11] Patent Number: 5,971,090
[45] Date of Patent: Oct. 26, 1999

[54] TORQUE LIMITING DEVICE FOR MOTORS IN ELECTICALLY DRIVEN VEHICLES AND ELECTRICALLY DRIVEN VEHICLE INCORPORATION THE TORQUE LIMITING DEVICE

[75] Inventors: Tatsuaki Tanaka, Kasai; Toshihiro Suhara, Taka-gun; Hiroaki Sagara, Kasai; Toshihiro Matsumoto, Kasai; Yoshihiko Maeda, Kasai, all of Japan

[73] Assignee: Sanyo Electric Co., Ltd., Japan

[21] Appl. No.: 08/918,591

[22] Filed: Aug. 19, 1997

[30] Foreign Application Priority Data

Aug. 20, 1996 [JP] Japan ................... 8-237191

[51] Int. Cl.⁶ .................................................. B62K 11/00
[52] U.S. Cl. .......................................... 180/205; 180/220
[58] Field of Search ................................... 180/205, 206, 180/207, 220

[56] References Cited

U.S. PATENT DOCUMENTS

| | | | |
|---|---|---|---|
| 5,237,263 | 8/1993 | Gannon | 180/205 |
| 5,341,892 | 8/1994 | Hirose et al. | 180/220 |
| 5,370,200 | 12/1994 | Takata | 180/206 |
| 5,758,736 | 6/1998 | Yamauchi | 180/220 |
| 5,806,621 | 9/1998 | Soda et al. | 180/206 |
| 5,857,537 | 1/1999 | Matsumoto et al. | 180/206 |
| 5,860,487 | 1/1999 | Tanaka et al. | 180/206 |

FOREIGN PATENT DOCUMENTS

| | | |
|---|---|---|
| 0590674 | 9/1992 | European Pat. Off. . |
| 0610682 | 8/1994 | European Pat. Off. . |
| 0675037 | 10/1995 | European Pat. Off. . |
| 0700826 | 3/1996 | European Pat. Off. . |
| 0749203 | 12/1996 | European Pat. Off. . |

*Primary Examiner*—Lanna Mai
*Assistant Examiner*—Michael Cuff
*Attorney, Agent, or Firm*—Morrison Law Firm

[57] ABSTRACT

A torque limiting device for motors in electrically driven vehicles includes a control device for controlling an electric driving power supplied to a motor in an electrically driven vehicle; a detecting section for detecting a driven state of the motor and outputting an output signal of the motor; and an upper electric driving power limit setting device in which a plurality of restricting values corresponding to the output signal from the detecting section are previously set, wherein the upper electric driving power limit setting device gives a command to the control device to restrict an upper limit of the driving power on the basis of one of the plurality of restricting values when the output signal is outputted, thereby limiting a torque of the motor.

8 Claims, 15 Drawing Sheets

TORQUE LIMITING DEVICE FOR MOTORS IN ELECTRICALLY DRIVEN VEHICLES AND ELECTRICALLY DRIVEN VEHICLE INCORPORATION THE TORQUE LIMITING DEVICE

BACKGROUND OF THE INVENTION

1. Field of the Invention

The present invention relates to a torque limiting device for motors in electrically driven vehicles and an electrically driven vehicle incorporating the torque limiting device. More particularly, the present invention relates to a torque limiting device which is suitable for limiting the torque so that the motor as a driving power source may not rotate at a speed exceeding a predetermined value in electrically driven vehicles such as an electrically driven bicycle, an electrically driven wheelchair, and an electric automobile, and which is especially suitable for use in an electric bicycle often referred to as an "electrically assisted bicycle" in which the human driving power is assisted by a motor driving power.

2. Description of the Related Arts

Recently, electric motorcars are attracting public attention. Also, popularity is enjoyed by electric bicycles having both a human power driving section utilizing a human power and an electric power driving section utilizing a motor so that the motor is driven in accordance with the magnitude of human driving power to assist the human driving power with the motor driving power.

Such an electric bicycle is disclosed, for example, in Japanese Unexamined Patent Publication (Kokai) No. Hei 6(1994)-107266. Namely, it is generally known in the art that a vehicle speed signal detected by a vehicle speed detection means such as a speed sensor provided in a wheel and a pedalling signal which is a human driving power detected by a pedalling power detection means are inputted into a controller whereby the assist ratio, namely the ratio of the motor driving power to the human driving power, are varied in accordance with the vehicle speed on the basis of predetermined table data.

In such an electrically assisted bicycle which outputs a motor output in accordance with the human driving power, a control as shown in the conceptual view of running of FIG. 4 is performed in order to protect the user from the risk of gaining excessive speed. Namely, the assist ratio which is a ratio of the motor driving power relative to the human driving power is maintained within a safety range by setting the assist ratio to be 1 when the bicycle speed is 15 km/h or less, allowing the ratio to linearly decrease from 1 to 0 when the bicycle speed is more than 15 km/h and less than 24 km/h, and setting the ratio to be 0 when the bicycle speed is 24 km/h or more to stop the driving by the motor driving power. The above relation is illustrated by a graph in FIG. 5.

For that purpose, the electrically assisted bicycle includes a torque sensor for detecting the torque of the human driving power, a speed sensor for detecting the running speed, and a microcomputer for performing calculations to determine the motor driving power, whereby the torque of the human driving power obtained by the torque sensor and the running speed obtained by the speed sensor are inputted to change the assist ratio on the basis of the table data stored in the microcomputer.

For example, supposing that a torque of 100 kg·cm based on the human driving power is applied, the torque based on the motor driving power is set to be 100 kg·cm when the running speed is 10 km/h, whereas an output of 44 kg·cm based on the motor driving power is calculated in the microcomputer and outputted when the running speed is 20 km/h because the assist ratio must be reduced to about 0.44.

However, if the speed sensor has errors or if the speed sensor is out of order, the real output may possibly exceed a predetermined value to give an excessive assist ratio or may possibly be too much smaller than the predetermined range to provide a sufficient assist because the speed determined by the speed sensor is different from the real running speed although the microcomputer performs calculations correctly.

Also, since the speed sensor must be provided in a driving wheel or the like which is a body of revolution, a wiring is needed, making the structure complex, or the wiring itself poses an obstacle.

SUMMARY OF THE INVENTION

The purpose of the present invention is to obtain a torque limiting device for limiting within a designated range an output torque of the motor for driving an electrically driven vehicle without using a speed sensor. More particularly, the purpose of the present invention is to provide a torque limiting device for limiting the output torque of the assisting motor of an electric bicycle within a safety range.

Accordingly, the present invention provides a torque limiting device for a torque limiting device for a motor in an electrically driven vehicle, comprising: a control device for controlling an electric driving power supplied to the motor; a detecting section for detecting a driven state of the motor and outputting an output signal thereof; and an upper electric driving power limit setting device in which a plurality of restricting values corresponding to the output signal from the detecting section are previously set, wherein the upper electric driving power limit setting device gives a command to the control device to restrict an upper limit of the driving power on the basis of one of the plurality of restricting values when the output signal is outputted, thereby limiting a torque of the motor.

When the driving of the motor is controlled according to the above construction of the present invention, a target driving torque signal of the motor is first determined and then an electric driving power for driving the motor, for example a duty, is prepared on the basis of the target driving torque signal. At this time, an output current of the battery, an output current of the motor, a motor torque signal, or the like is employed as a motor output signal indicating the driven state of the motor. This motor output signal is inputted into an upper electric driving power limit setting device to determine an upper limit of the duty which is a driving power.

Therefore, the driving is controlled with a comparatively small driving signal, namely a comparatively small duty, so that the motor output signal is equal to the above-mentioned target driving torque signal when the rotation speed of the motor is small. When the rotation speed of the motor increases, the duty which is an electric driving power must be increased in order to equate the motor output signal with the target driving torque signal. At this time, an upper duty limit is determined by the upper electric driving power limit setting device and the upper limit of the duty prepared in the control device in accordance with the output of the upper electric driving power limit setting device is restricted.

Accordingly, it is possible to suppress the duty for driving the motor which increases when the rotation speed of the motor becomes large. This makes it possible to limit the output torque of the motor for driving the electrically driven vehicle within a designated range such as a safety range or a legally regulated range without using a speed sensor.

DETAILED DESCRIPTION OF THE PREFERRED EMBODIMENTS

Figure 1:
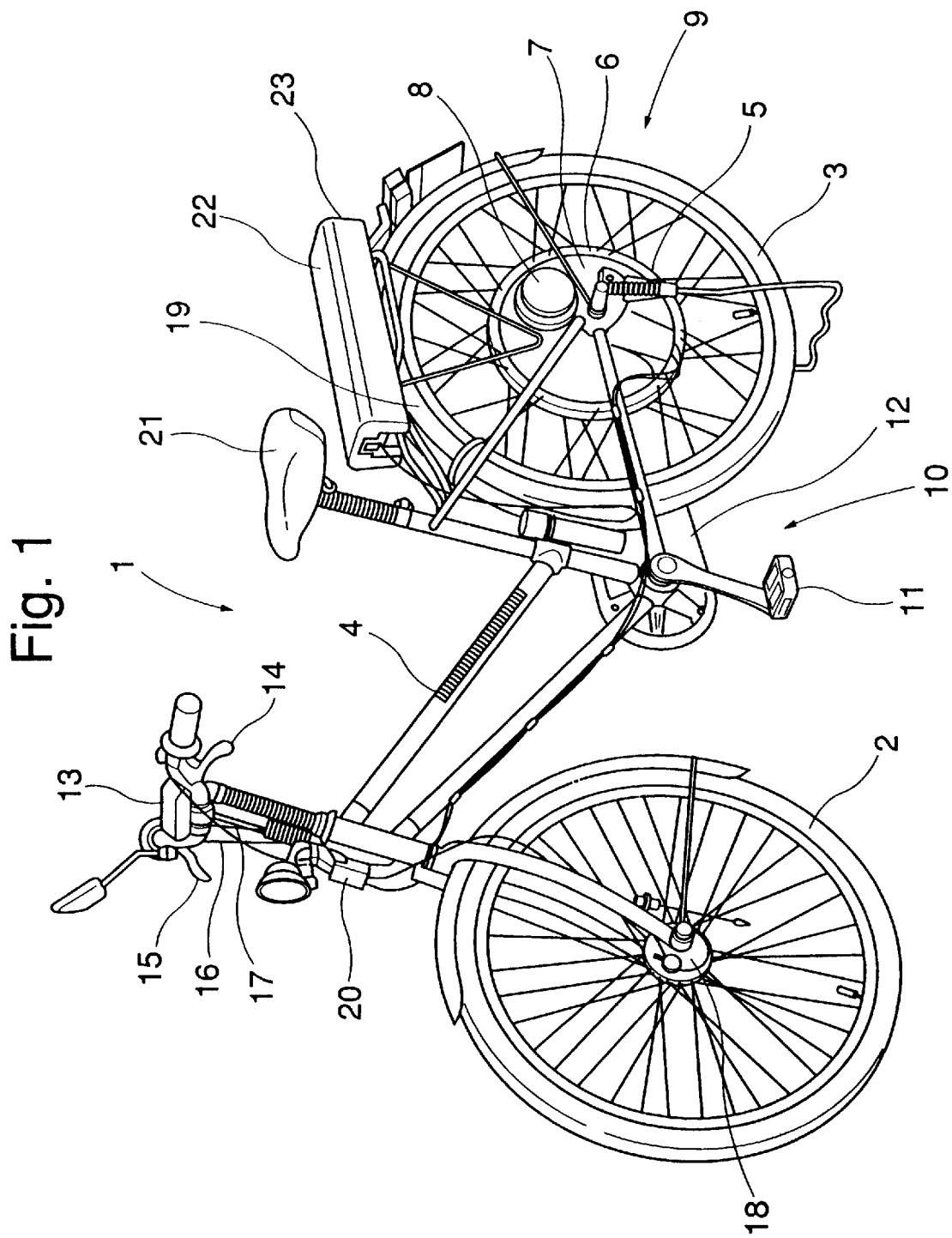
FIG. 1 is an overall perspective view illustrating an electric bicycle.

Preferably, the torque limiting device according to the present invention further comprises a motor torque setting device in which torques of the motor to be limited by the upper electric driving power limit setting device are previously set, whereby the control device is operated on the basis of the output from the motor torque setting device.

In the torque limiting device according to the present invention, the control device may be, for example, a pulse width modulation control device. In this case, the electric driving power supplied to the motor is controlled by performing a pulse width modulation control. This makes it possible to limit the output torque of the motor for driving the electrically driven vehicle within a designated range without using a speed sensor.

The motor output signal indicating the driven state of the motor may be determined by an output current from the battery. This makes it possible to limit the output torque of the motor for driving the electrically driven vehicle within a designated range without using a speed sensor, since the motor output is approximately proportional to the magnitude of the output current from the battery.

Alternatively, the motor output signal may be determined by an output current from the motor. This makes it possible to limit the output torque of the motor for driving the electrically driven vehicle within a designated range without using a speed sensor, since the motor output is proportional to the magnitude of the output current from the motor.

Still alternatively, the motor output signal may be determined by the torque of the motor to be limited. This makes it possible to limit the output torque of the motor for driving the electrically driven vehicle within a designated range without using a speed sensor.

Preferably, the upper electric driving power limit setting device is an upper duty limit setting device, whereby the electric driving power controlled by the control device is restricted on the basis of upper duty ratio limits which are the restricting values. In this case, the motor is controlled by changing the duty to the motor. This makes it possible to limit the output torque of the motor for driving the electrically driven vehicle within a designated range without using a speed sensor.

Preferably, the upper electric driving power limit setting device determines the upper electric driving power limit on the basis of the motor output signal and the power supply voltage designation signal or on the basis of the motor output signal and the motor characteristics designation signal.

This makes it possible to limit the output torque of the motor for driving the electrically driven vehicle within a designated range without using a speed sensor when specific motor characteristics and a specific power supply voltage are employed. Further, it is possible to limit the output torque of the motor for driving the electrically driven vehicle within a designated range even if plural kinds of motors having different motor characteristics are alternately used or if plural kinds of power sources (for example, batteries) having different voltages are used alternately for one motor.

Preferably, the upper electric driving power limit setting device determines the upper electric driving power limit in accordance with the size of the driving wheel.

This makes it possible to limit the output torque of the motor for driving the electrically driven vehicle within a designated range without using a speed sensor when specific motor characteristics and a specific power supply voltage are employed. Further, it is possible to limit the output torque of the motor for driving the electrically driven vehicle within a designated range even if the torque limiting device of the present invention is mounted onto plural kinds of electrically driven vehicles having driving wheels of different sizes for one motor.

Further, the motor for the electrically driven vehicle may be a motor for an electrically assisted bicycle in which the human driving power is assisted by the motor driving power.

This makes it possible to limit the output torque of the motor for driving the electrically assisted bicycle within a designated range without using a speed sensor. Further, the output torque of the motor for driving an electrically assisted bicycle can be limited within a designated range even in the case in which a plurality of motors having different characteristics are alternately used or in which a plurality of power supplies having different voltages (for example, batteries) are alternately used for one motor or in which the same torque limiting device of the present invention is mounted onto a plurality of bicycles having driving wheels of different sizes for one motor. Therefore, there will be a large freedom in the adjustment of the characteristics of the motor, the selection of the power supply (batteries), and the selection of the size of the wheels in an electrically assisted bicycle.

In the case where the electrically driven vehicle is an electrically assisted bicycle, the upper electrical driving power limit setting device preferably determines the upper limit of the electric driving power so that the assist ratio which is a ratio of the motor driving power to the human driving power lies within a restricted range.

This provides an effect that, since the output torque of the motor for driving an electrically assisted bicycle can be limited within a designated range without using a speed sensor, it is possible to prevent excess assistance in which the real output is too large and insufficient assistance in which the real output is too small when the speed determined by the speed sensor is different from the real speed as in the case where a conventional speed sensor is used.

Preferably, the torque limiting device according to the present invention may be incorporated into an electrically driven vehicle.

Further, the electrically driven vehicle may be an electrically assisted bicycle in which a human driving power is assisted with a motor driving power.

Embodiments

The torque limiting device for motors in electrically driven vehicles according to the present invention will now be detailed. With reference to attached drawings, an explanation will be given on a type of electric bicycles in which the rear wheel as a driving wheel is directly driven by an electric motor. This type of electric bicycles are often referred to as electric bicycles of direct rear-wheel driving type. The inventors of the present invention have been providing this type of electric bicycles.

It is to be noted, however, that these examples and drawings are merely for illustrative purposes and are not to limit the scope of the present invention.

FIG. 1 is an overall perspective view of an electric bicycle of direct rear-wheel driving type, in which the reference numeral 1 represents a main body of the electric bicycle. A later-mentioned motor 8 is provided in the main body 1 of the electric bicycle so that the driving power of the motor 8 is changed in accordance with the torque generated by the human driving power to assist the human driving power with the driving power of the motor 8 for running the bicycle.

A front wheel 2, a rear wheel 3, handle bars 13 and a saddle 21 are mounted to a frame 4 of the main body 1 of the electric bicycle. The front wheel 2 is steered by the handlebars 13. The rear wheel 3 is a driving wheel and a disk-like casing 5 is provided at the rotating shaft of the rear wheel 3.

The disk-like casing 5 comprises a rotary casing 6 capable of being rotated and a fixed casing 7 fixed onto the main body 1 of the electric bicycle. The rotary casing 6 rotates integrally with the rear wheel 3.

A motor 8 for electric assistance is housed in the disk-like casing 5. The motor 8 is driven for rotating the rotary casing 6 together with the later-mentioned human power driving section 10 when an electric driving power is needed. The disk-like casing 5 is a part of an electric power driving section 9.

The human power driving section 10 includes a pedal 11 and a chain 12. When the user presses the pedal 11, the rear wheel 3 is rotated via the chain 12. Although the chain 12 is a member for transmitting the human driving power in this Example, the transmission member is not limited thereto and a belt, a rotating shaft, or the like may be used as well instead of the chain 12.

Brake levers 14, 15 are mounted to the right and left sides of the handlebars 13 for steering the front wheel 2. Braking devices 18, 19 are provided in the front wheel 2 and the rear wheel 3, respectively. The brake levers 14, 15 and the braking devices 18, 19 are connected by the wires 16, 17.

When the brake levers 14, 15 are pressed, the wires 16, 17 are pulled and these wires 16, 17 in turn operate the braking devices 18, 19 in the front and in the rear, respectively. A brake switch 20 is provided in the middle of the wires 16, 17 for stopping the supply of electric power to the motor 8 when the brake levers 14, 15 are operated.

A battery section 22 serving as a power source to the motor 8 is mounted to the frame 4 of the rear wheel 3. The battery section 22 includes a battery case 23 and twenty rechargeable batteries of unit-one type stored in the battery case 23. The battery case 23 slides on the frame 4 to be attached thereto or detached therefrom. The power source voltage is approximately 24 volts. The battery case 23 may be disposed at a position other than the frame 4.

Figure 2:
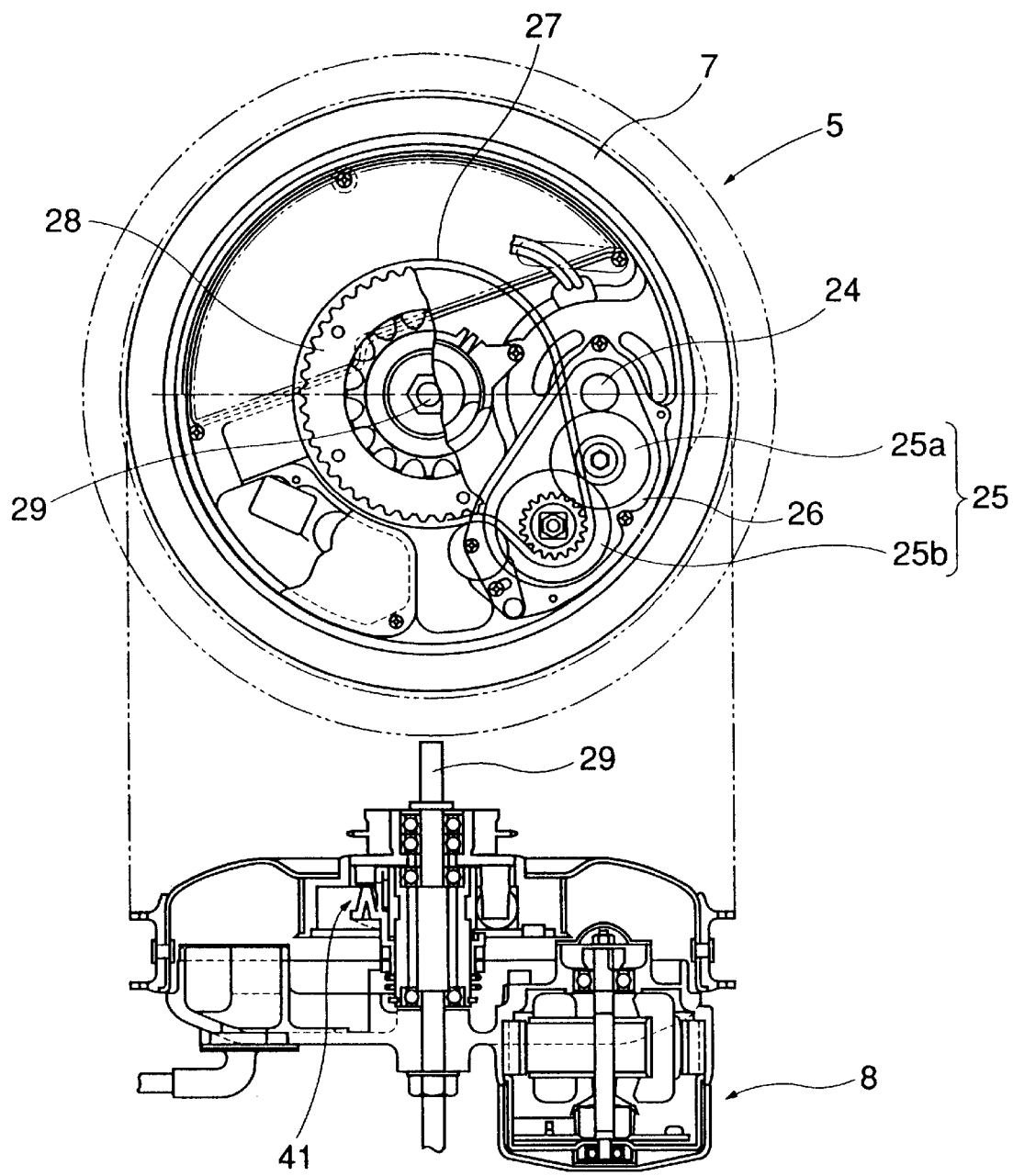
FIG. 2 is a front view and a side view illustrating a construction of a disk-like casing.
Figure 3:
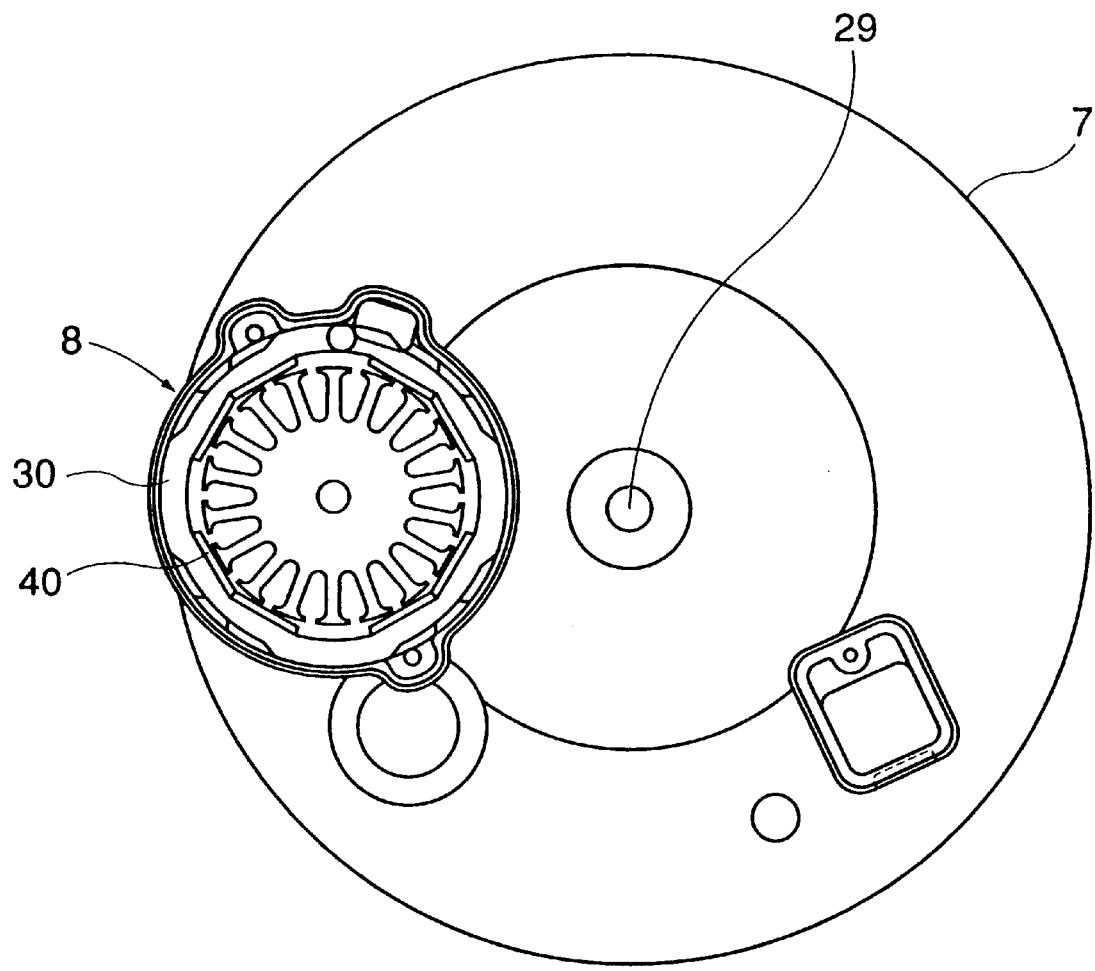
FIG. 3 is a view illustrating a configuration in which a motor is disposed on the disk-like casing.
Figure 4:
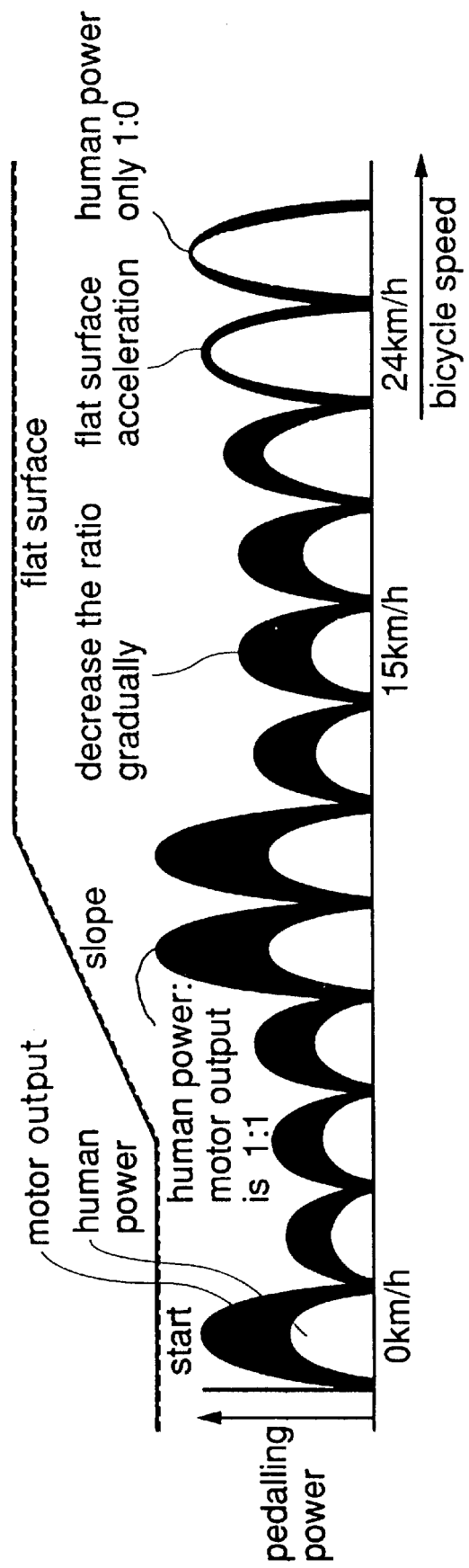
FIG. 4 is a conceptual view showing an electrically assisted bicycle in running.

With reference to FIGS. 2 and 3, the disk-like casing 5 is now explained. FIG. 2 is a front view illustrating a construction of the disk-like casing 5 shown in FIG. 1, in which the reference numeral 7 represents a fixed casing fixed onto the main body 1 of the electric bicycle.

The fixed casing 7 houses a control section (not shown), a motor 8, a speed reduction mechanism 26, and a transmission belt 27. The control section includes a control substrate, a radiator plate, and the like. The speed reduction mechanism 26 includes a pulley pair 25 of a first pulley group 25a and a second pulley group 25b and a last pulley 28 (third pulley) for transmitting an output of the output shaft 24 of the motor 8. The transmission belt 27 serves to connect each of the pulleys and the last pulley 28 of the speed reduction mechanism 26.

The last pulley 28 is fixed onto the rotary casing 6. The rotation of the motor 8 is transmitted from the output shaft 24 of the motor 8 to the last pulley 28 via the transmission belt 27, whereby the speed of the rotation is reduced and the rotary casing 6 is rotated together with the last pulley 28.

Further, the disk-like casing 5 is provided with a torque sensor 41 for detecting a human power torque applied to the pedal 11. A human power torque signal from the torque sensor 41 is inputted into the control board. The motor 8 is controlled to be driven in accordance with the human power torque signal, for example, by the same driving power.

A one-way clutch (not shown) is introduced into the smaller pulley of the second pulley group 25b connected to the last pulley 28, whereby the driving power of the motor 8 is cut off when the rotation of the pedal 11 exceeds the rotation of the motor 8.

FIG. 3 is a front view of a configuration in which the motor 8 is disposed in the disk-like casing 5. The reference numeral 30 and 40 represent a stator and a magnet, respectively.

The principle of the present invention will now be explained in detail with reference to the attached drawings.

Referring again to FIG. 5, the relationship between the assist ratio As (%) and the bicycle speed S (km/h) is:

$$As=(24-S)/9 \text{(wherein } 15 \leq S \leq 24) \tag{1}$$

Figure 6:
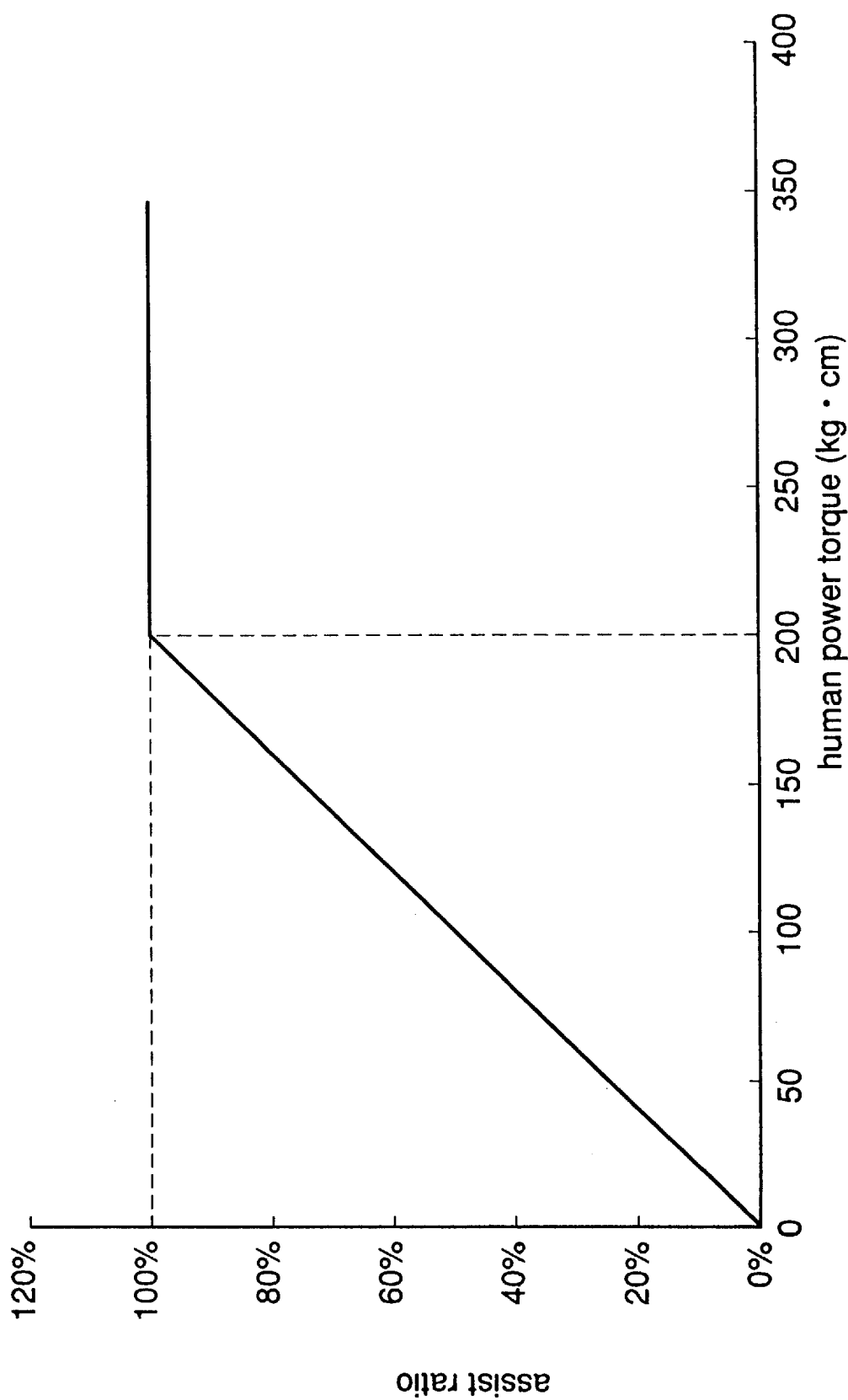
FIG. 6 is a graph showing a relationship between the assist ratio and the human power torque.

As shown in FIG. 6, the relationship between the assist ratio At (%) and the human power torque Tc (kg·cm) is:

$$At = Tc/200 \text{(wherein } 0 \leq Tc \leq 200) \quad (2)$$

Since the assisting motor torque Tm is represented by the equation: Tm=Tc·At, the relationship between the assisting motor torque Tm (kg·cm) and the human power torque Tc (kg·cm) is:

$$Tm \leq Tc^2/200 \quad (3)$$

From the formulas (2) and (3), the relationship between the assist ratio At (%) and the assisting motor torque Tm (kg·cm) will be:

$$200At \geq (200Tm)^{1/2}$$

$$At \geq (Tm/200)^{1/2} \quad (4)$$

Since it is absolutely necessary that the assist ratio At (%) to the motor does not exceed the assist ratio As (%) to the bicycle speed, the relationship: As≧At holds.

Therefore, from the formulas (1) and (4), the relationship between the assisting motor torque Tm (kg·cm) and the bicycle speed S (km/h) will be:

$$(24-S)/9 = As \geq At \geq (Tm/200)^{1/2} \quad (5)$$

$$(24-S)/9 = (Tm/200)^{1/2}$$

$$Tm \leq 200\{(24-S)/9\}^2$$

Figure 5:
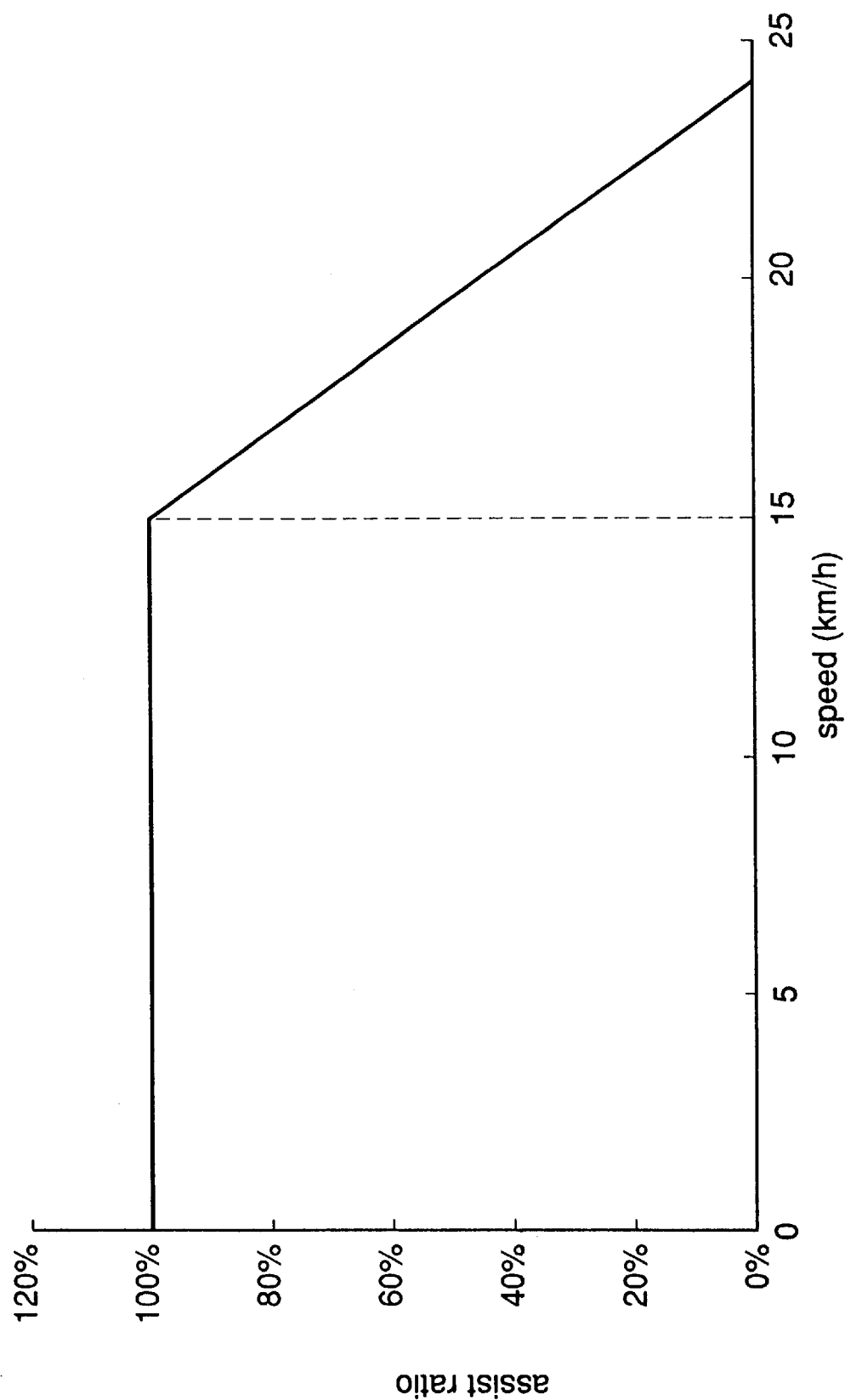
FIG. 5 is a graph showing a relationship between the assist ratio and the vehicle speed according to the regulations.
Figure 7:
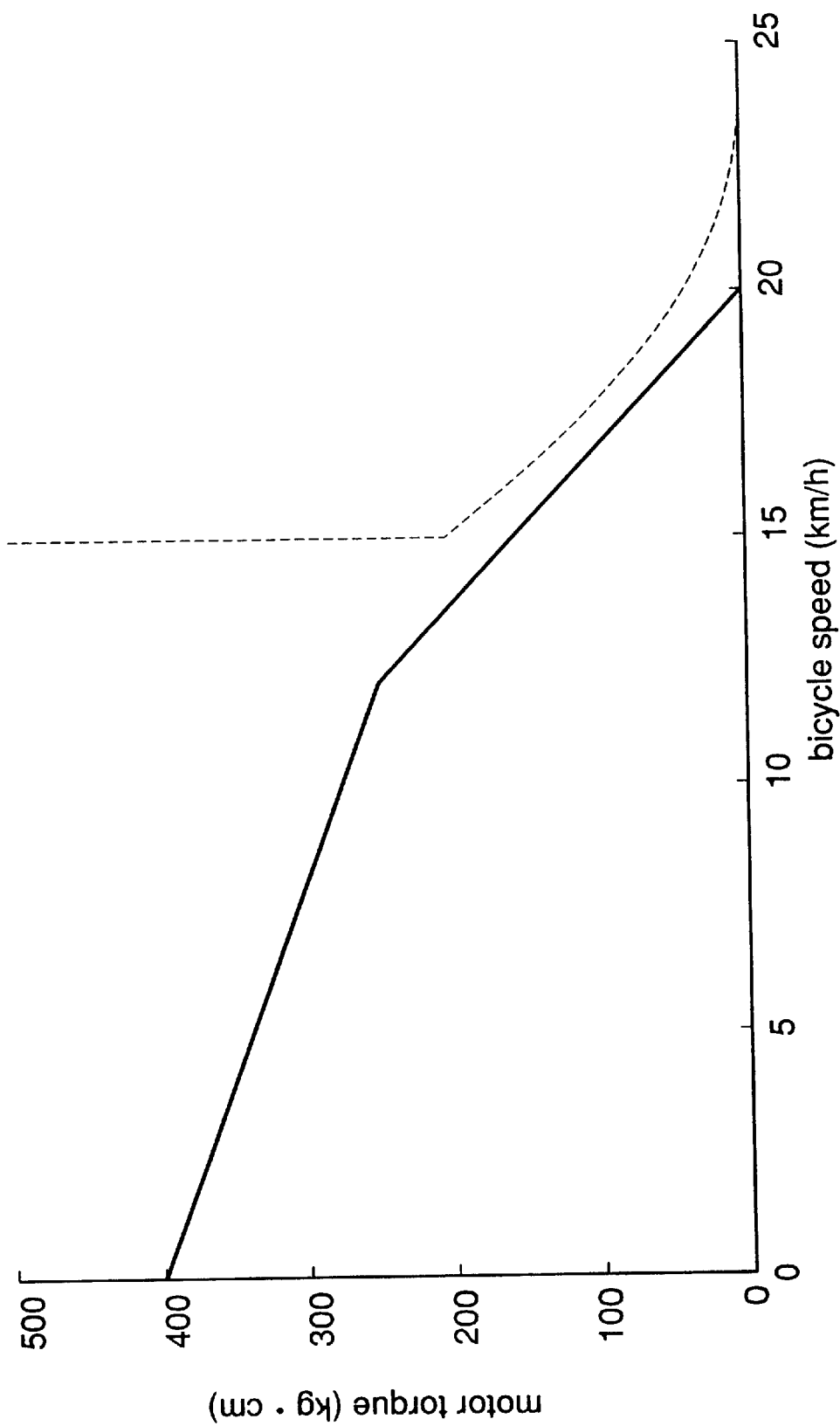
FIG. 7 is a graph showing motor torque characteristics relative to the vehicle speed which satisfy the regulations.

It is understood from the formula (5) that, when the assist ratio At (%) relative to the human power torque Tc (kg·cm) is set as shown in FIG. 6, the motor torque characteristics in accordance with the bicycle speed must be such that the torque curve lies in a region which is on the left side of the broken line shown in FIG. 7 in order to satisfy the predetermined relationship of FIG. 5 between the speed of the electric bicycle and the assist ratio.

Figure 8:
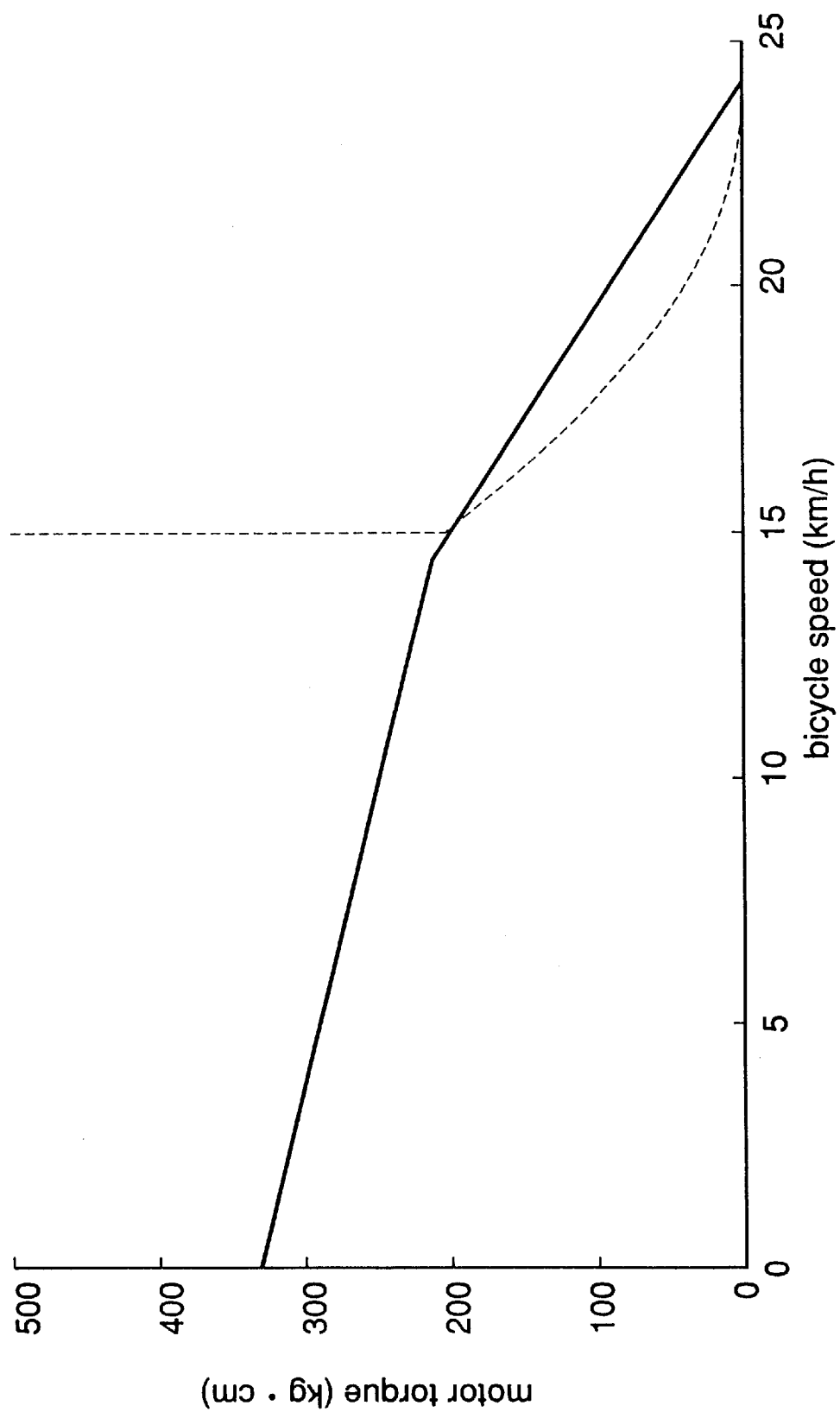
FIG. 8 is a graph showing motor torque characteristics relative to the vehicle speed before the torque is limited and controlled.

However, the torque curve will trespass (i.e. come to the other side of) the boundary line (the broken line) of the condition in the above formula (5) if an assisting motor is used with a relationship between the motor torque and the bicycle speed as shown by the real line of FIG. 8.

Figure 9:
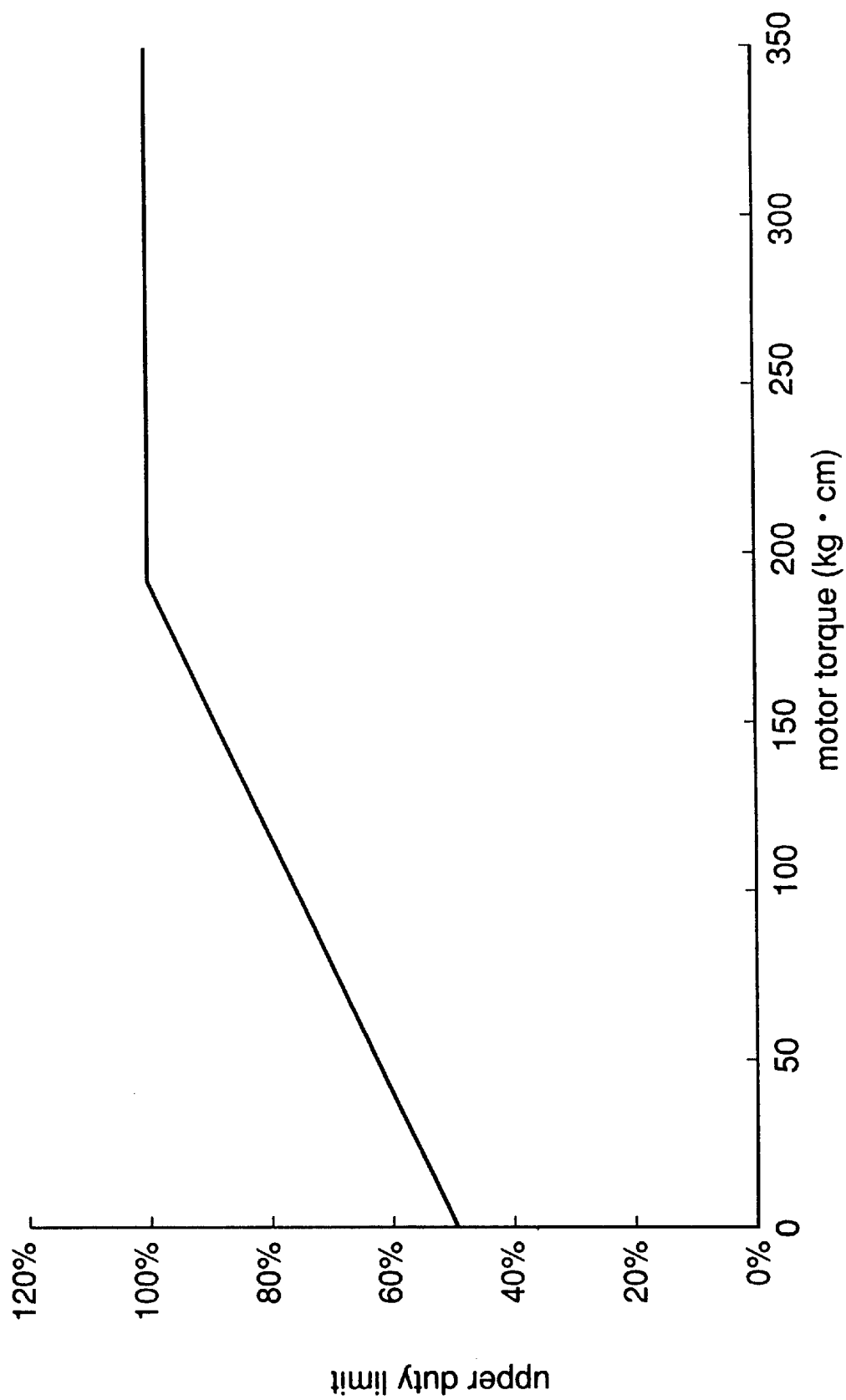
FIG. 9 is a graph showing an upper duty limit of the pulse width control relative to the motor torque.
Figure 10:
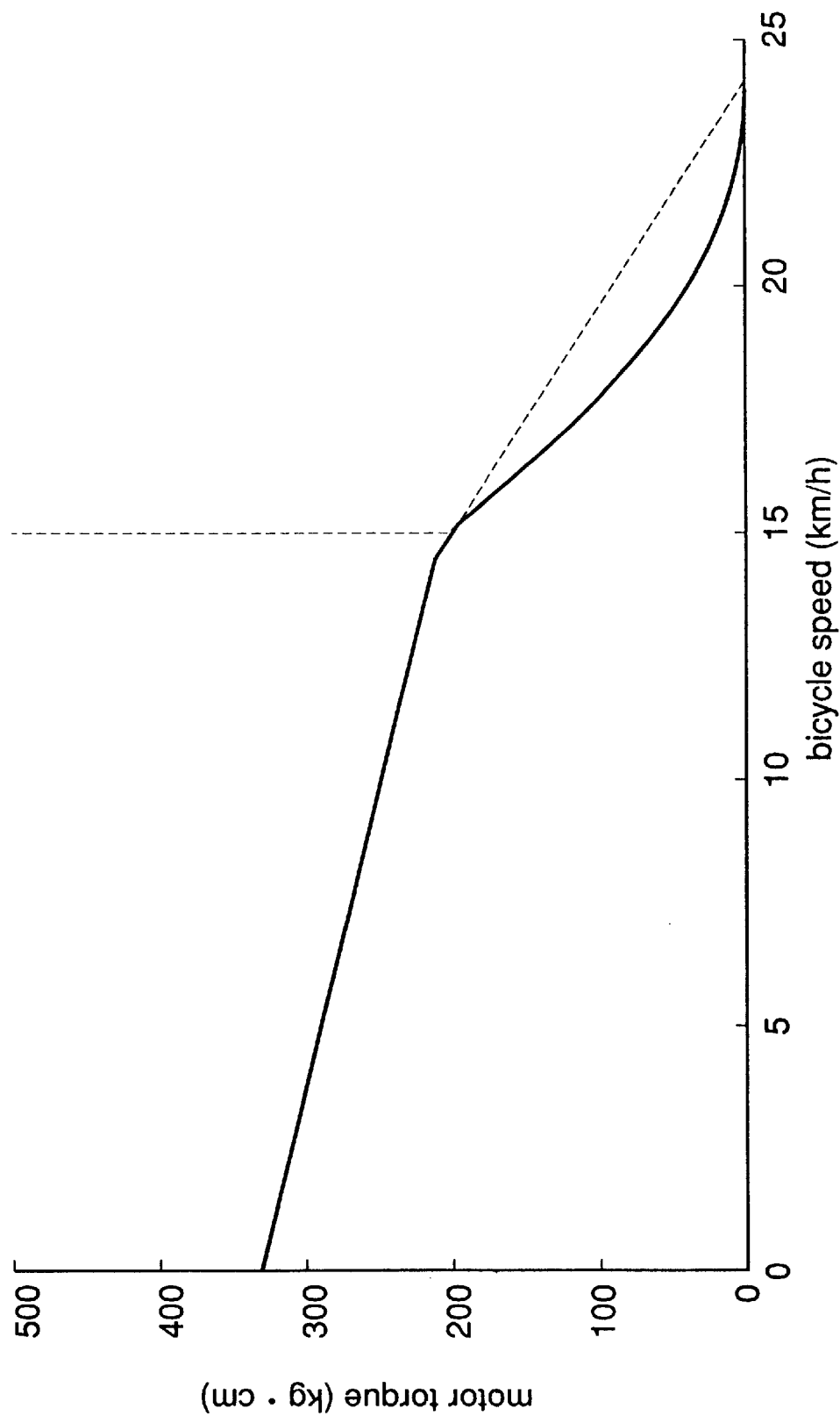
FIG. 10 is a graph showing motor torque characteristics relative to the vehicle speed after the torque is limited and controlled.

Therefore, in order to solve these problems, the driving of the assisting motor is controlled by controlling the electric current utilizing the pulse width modulation control (PWM control) in the present invention. In this case, if the relationship between the upper duty limit of the pulse width modulation control and the motor torque is set as shown in FIG. 9, it is possible to obtain a relationship between the motor torque and the bicycle speed as shown in FIG. 10. Thus, it is possible to suppress the motor torque at a bicycle speed of more than 15 km/h and the torque curve will lie in the region on the left side of the boundary line (the broken line) of the condition in the formula (5).

Figure 11:
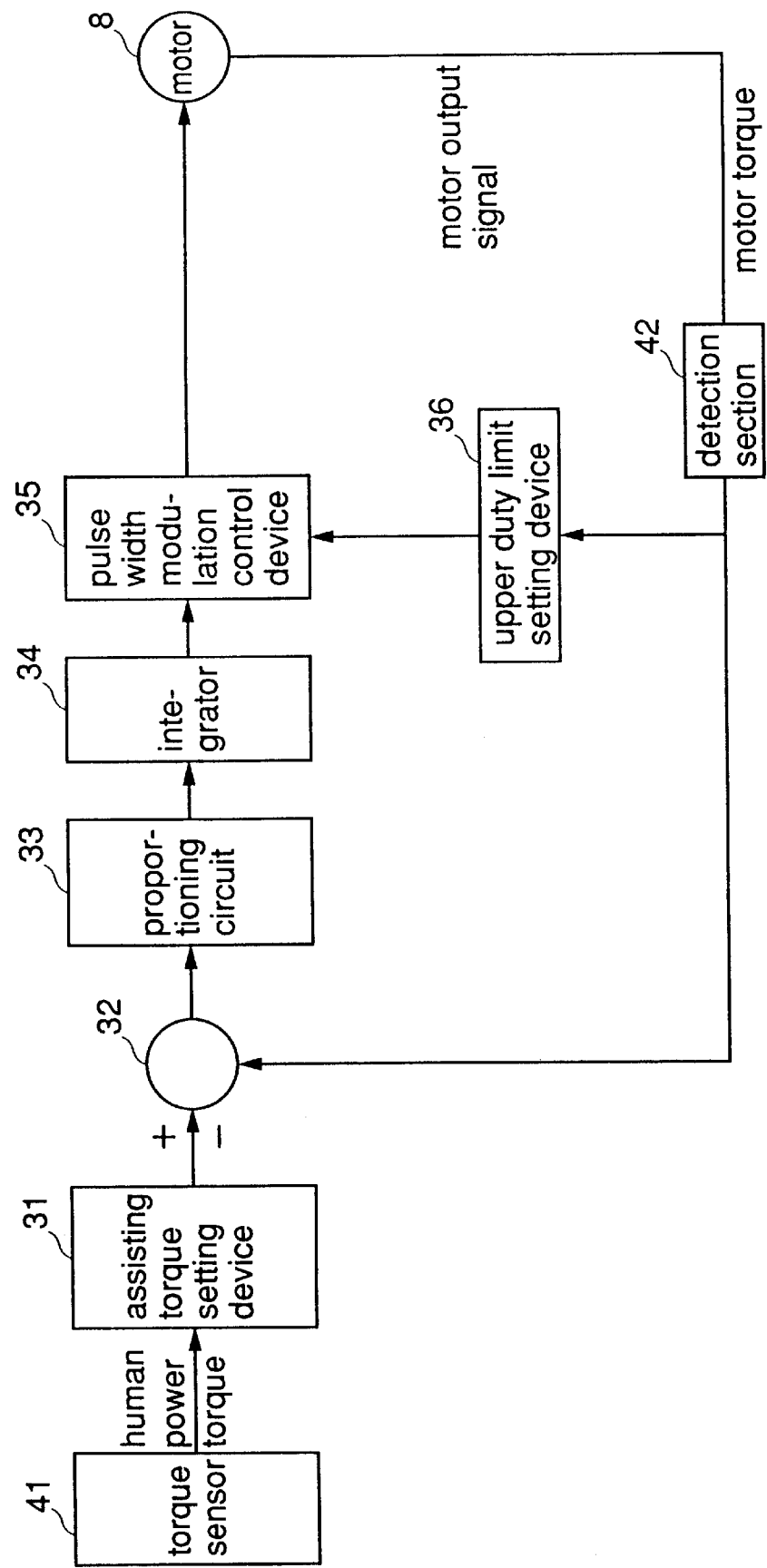
FIG. 11 is diagram illustrating an embodiment of the torque limiting device for electrically driven vehicles according to the present invention.

With reference to FIG. 11, an explanation is now given on an Example in which the torque limiting device for motors in electric vehicles according to the present invention performing the above torque limiting control is applied to an electric bicycle. Referring to FIG. 11, the reference numeral 8 represents a motor for assistance; 31 represents a motor torque setting device (namely, an assist torque setting device) for setting the driving torque of the motor 8 in accordance with the human power torque detected by the torque sensor 41; 32 represents a comparator for inputting the motor torque signal by feedback as a signal showing the rotation state of the motor 8 and for comparing the motor torque signal with the value set by the assist torque setting device 31; 33 represents a proportioning circuit; 34 represents an integrator; 35 represents a controlling device (namely, a pulse width modulation (PWM) controlling device) for converting, into a pulse signal, the torque signal prepared for driving the motor 8; 36 represents an upper driving power limit setting device (namely, an upper duty limit setting device) for setting an upper limit of the driving signal outputted to the motor 8 from the pulse width modulation control device. The reference numeral 42 represents a detecting section disposed between the motor 8 and the upper duty limit setting device 36. The detecting section 42 detects the state of the motor 8 being driven and outputs it as a motor output signal.

The above torque limiting device according to the present invention is now explained. In the assist torque setting device 31, there is inputted an assist ratio of the aimed motor torque signal relative to the human power torque detected by the torque sensor of FIG. 6. When the human power torque determined by the torque sensor 41 is inputted, an assist torque instruction signal is outputted in accordance therewith.

The comparator 32 compares the inputted assist torque instruction signal with the actual fed-back driving torque signal of the motor 8 which is driven. The deviation obtained by the above comparison is proportioned and integrated through the proportioning circuit 33 and the integrator 34 and is inputted into the pulse width modulation (PWM) control circuit 35 of the next step to be controlled with a predetermined duty. Then, a driving current is supplied to the motor 8 in accordance with the duty, thereby supplying an assisting torque that satisfies the relationship between the human power torque and the assist ratio as shown in FIG. 6. For example, if the assisting torque is to be outputted at 100 Kg·cm and if the actual motor output signal of the driven motor is 90 Kg·cm, a feed-back control is carried out in which an assist torque instruction signal is generated so that the motor output signal will be 100 Kg·cm as determined by the assisting torque setting device 31, whereby the assisting torque will be approximated to the desired torque to be outputted as a duty in the pulse width modulation control device 35.

This Example shows a case in which the switching element is turned on or off to drive the motor 8 by means of PWM control. Alternatively, however, a resistance control method may be employed in which a power transistor is used instead of the switching element and the motor 8 is controlled by varying the voltage applied to the base of the power transistor.

Although in this Example, the output torque of the motor is approximated to the desired torque by feedback control, the motor may be driven without feeding back the motor output.

Here, the upper duty limit setting device 36 incorporates therein a table showing the relationship between the upper duty limit of the pulse width modulation control and the motor torque shown in FIG. 9. The duty of the pulse width modulation control device 35 is limited with a duty corresponding to the motor torque signal by the upper duty limit setting device 36 when the duty is made by the pulse width modulation control device 35 on the basis of a signal from the assisting torque setting device 31. Here, the duty is controlled by means of pulse width modulation on the basis of the signal from the assisting torque setting device 31 corresponding to the human power torque until the duty reaches its upper limit. When the motor torque signal attains the upper limit of the duty as shown in FIG. 9, the upper limit is inputted into the pulse width modulation control device 35 as the maximum duty, whereby the duty outputted to the motor 8 is restricted.

Specifically explained, in controlling the driving of the motor 8 with the above construction, a target driving torque signal of the motor 8 is determined by the assisting torque setting device 31 and a duty for driving the motor 8 is made on the basis of the target driving torque signal. At this time, a motor torque signal is used as the motor output signal indicating the driven state of the motor 8. This motor output signal is inputted into the upper duty limit setting device 36 for determination of the upper limit of the duty which is a driving signal. Therefore, when the rotation speed of the motor 8 is small, a comparatively small duty is employed so that the motor output signal will be equal to the target driving torque signal determined by the assisting torque setting device 31. On the other hand, when the rotation speed of the motor 8 is large, the duty must be increased in order to allow the motor output signal to be equal to the target driving torque signal determined by the assisting torque setting device 31. At this time, an upper limit of the duty is determined by the upper duty limit setting device 36, whereby the upper limit of the duty for the pulse width modulation made in the pulse width modulation control device 35 in accordance with the output of the upper duty limit setting device 36 is restricted. Accordingly, the duty for driving the motor 8, which increases in accordance with the increase in the rotation speed of the motor 8 is suppressed. This limits the output torque of the assisting motor 8 of the electrically driven vehicle within a predetermined range without using a speed sensor.

Although the motor torque signal is inputted into the upper duty limit setting device 36 for determination of the relationship of the upper duty limit of the pulse width modulation control in this Example, the signal to be employed is not specifically limited thereto. Namely, the signal may instead be a motor output signal such as a motor current which is in proportion to the motor torque. Further, the signal may be a battery current signal which is correlated to the motor torque or motor output.

As a result of this, the motor torque of the assisting motor 8 is suppressed so that the motor torque relative to the bicycle speed will have a relation shown in FIG. 10, satisfying the condition of the formula (5) that the torque curve lies in a region on the left side of the boundary line shown by the dotted line. Therefore, the motor output is appropriately controlled on the basis of the motor torque signal without detecting the rotation speed of the motor.

Figure 12:
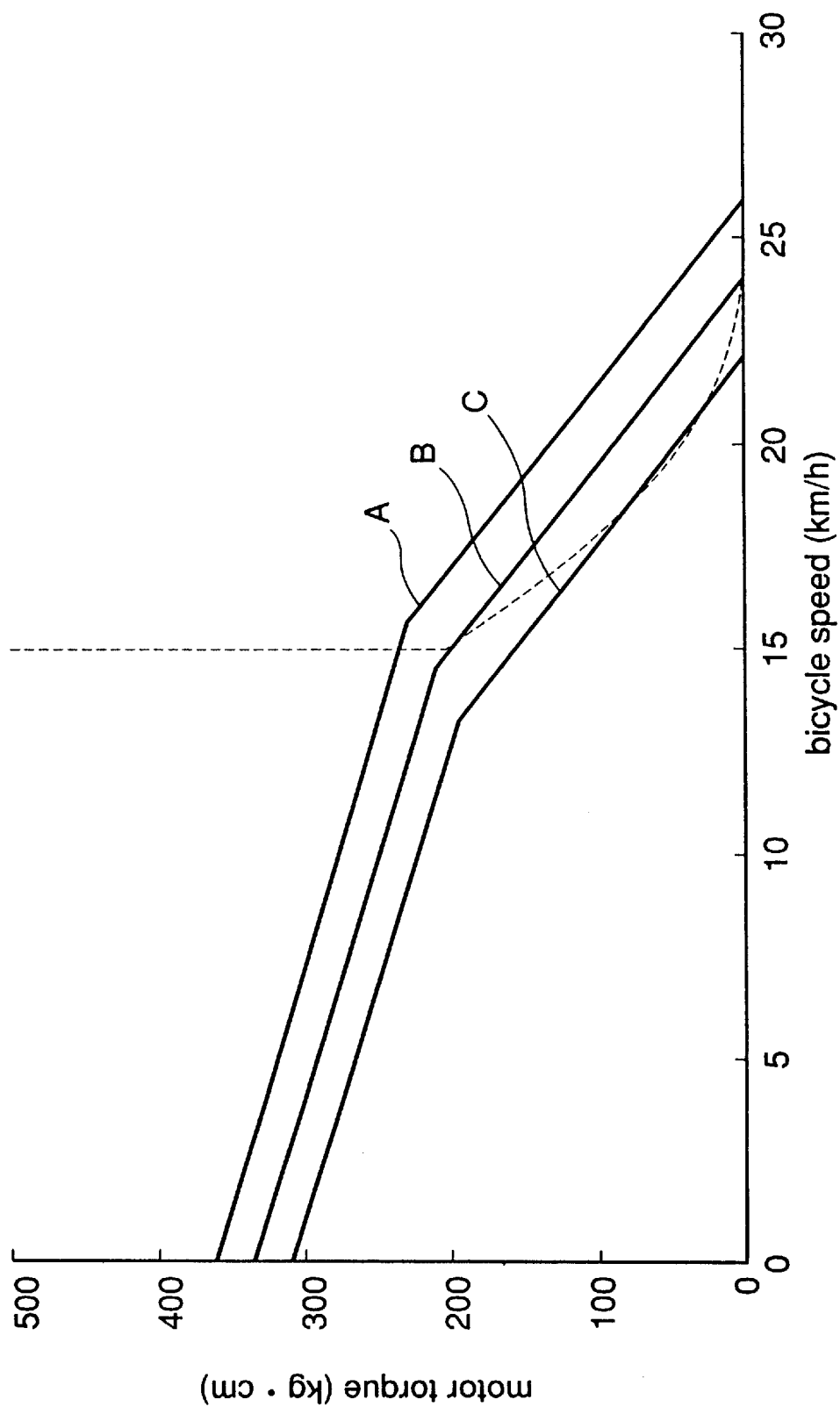
FIG. 12 is a graph showing motor torque characteristics relative to three different vehicle speeds before the torque is limited and controlled.

The above Example shows a case where a motor having specific motor characteristics and a power supply having a specific voltage are used. However, the relationship between the bicycle speed and the motor torque trespasses, at a portion thereof, the boundary line of the condition of the formula (5) shown by the dotted line if three kinds of motors having different motor characteristics are alternately used or three kinds of power supplies having different voltages (for example, batteries) are alternately used for one kind of motor or the same torque limiting device is mounted to three kinds of bicycles having wheels of different sizes, as shown by the real lines (A), (B), and (C) in FIG. 12.

Figure 13:
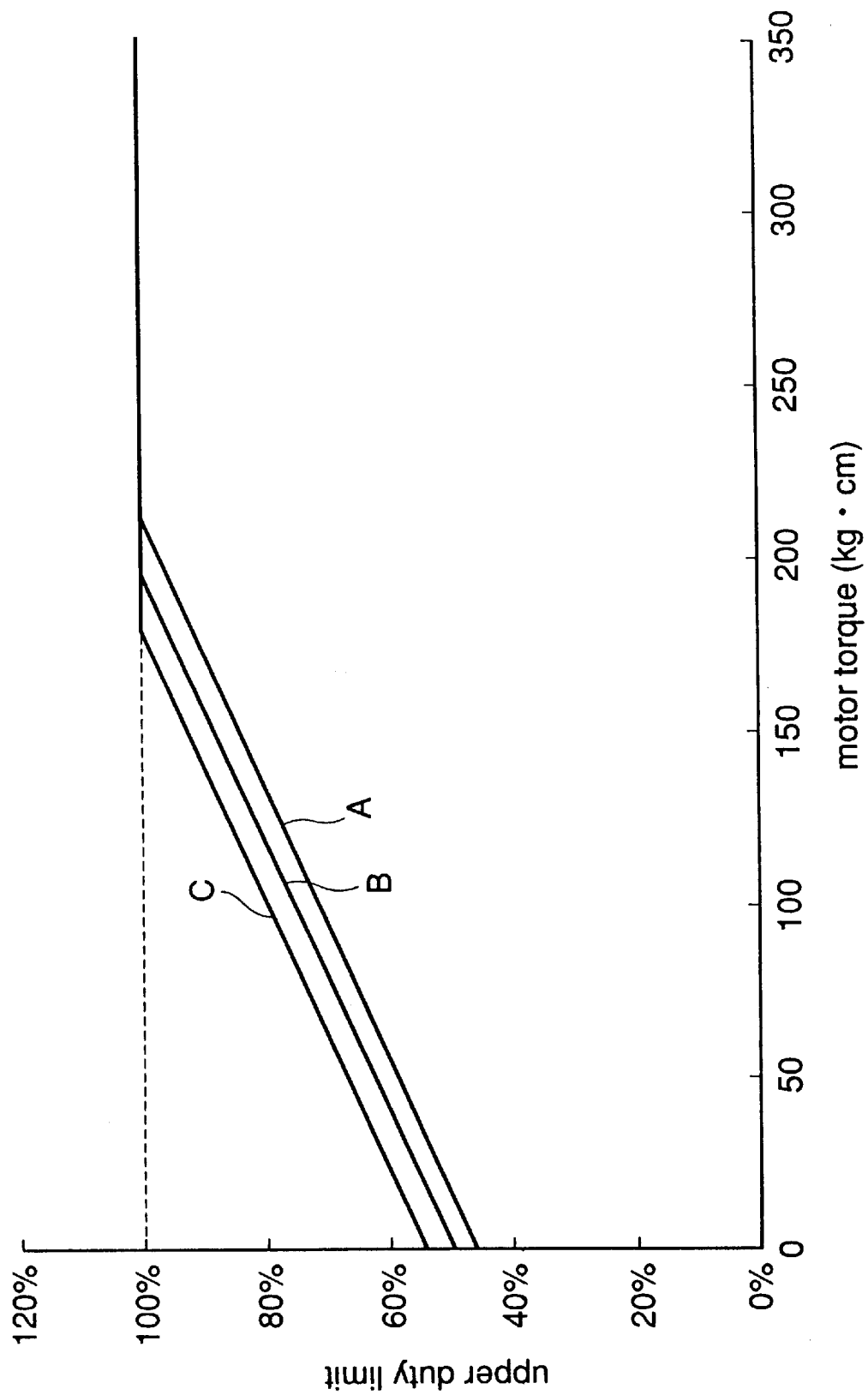
FIG. 13 is a graph showing an upper duty limit of the pulse width control relative to the motor torque.
Figure 14:
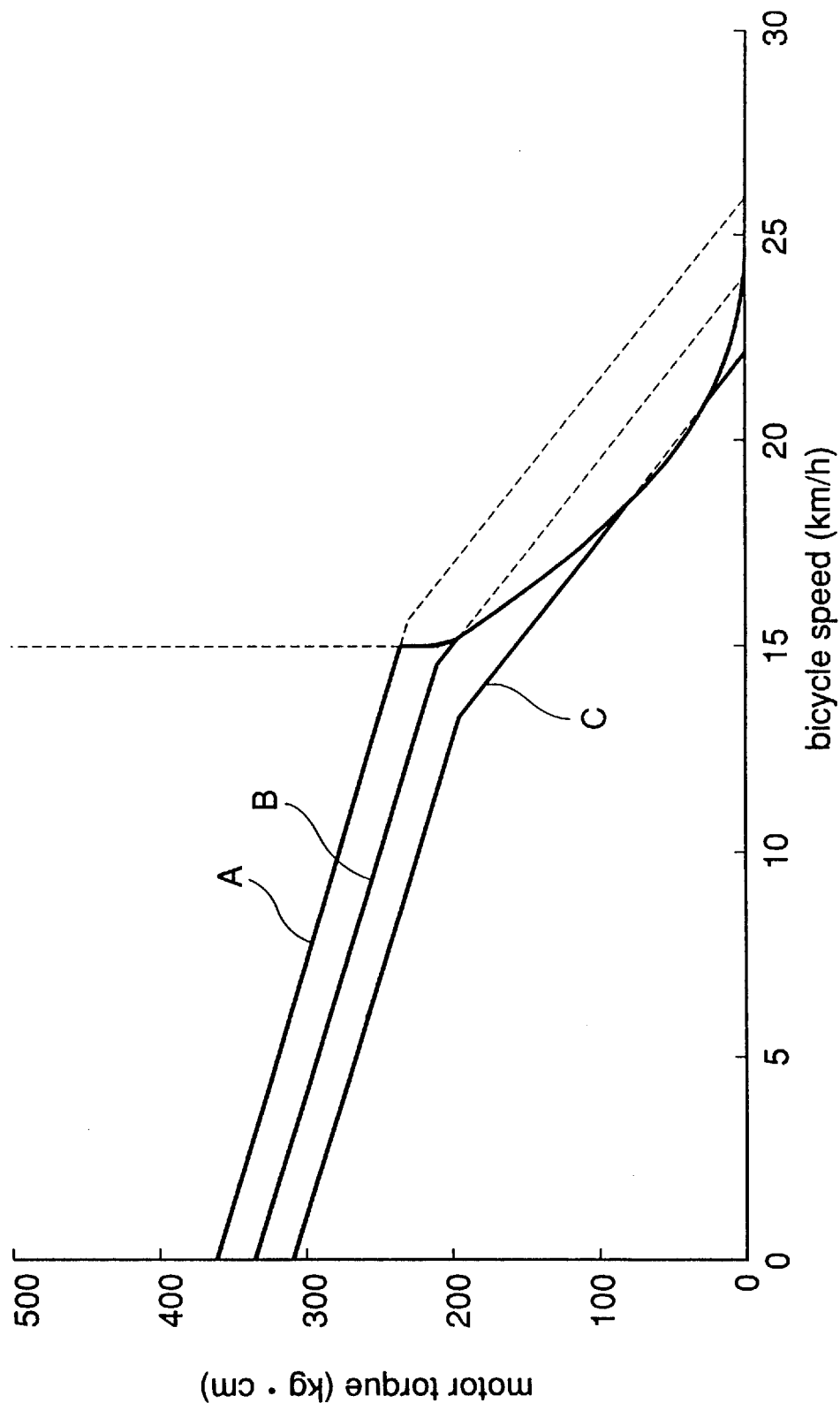
FIG. 14 is a graph showing motor torque characteristics relative to three different vehicle speeds after the torque is limited and controlled.

Therefore, in order to solve these problems, the driving of the assisting motor is controlled by means of the current control by pulse width modulation control in the present invention. In this case, a relationship between the motor torque and the bicycle speed as shown in FIG. 14 is obtained if the relationship between the upper duty limit of the pulse width modulation control and the motor torque is set as shown by (A), (B), and (C) of FIG. 13. Thus, the motor torque at a bicycle speed of about 15 km/h or over is suppressed and the torque curve will lie in a region on the left side of the boundary line of the condition of the formula (5) shown by the dotted line.

Next, with reference to FIG. 15, an explanation will be given on other Examples of the present invention in which a plurality of motors having different characteristics are alternately used or in which a plurality of power supplies having different voltages (for example, batteries) are alternately used or in which the same torque limiting device of the present invention is mounted onto each of a plurality of bicycles having wheels of different sizes.

Figure 15:
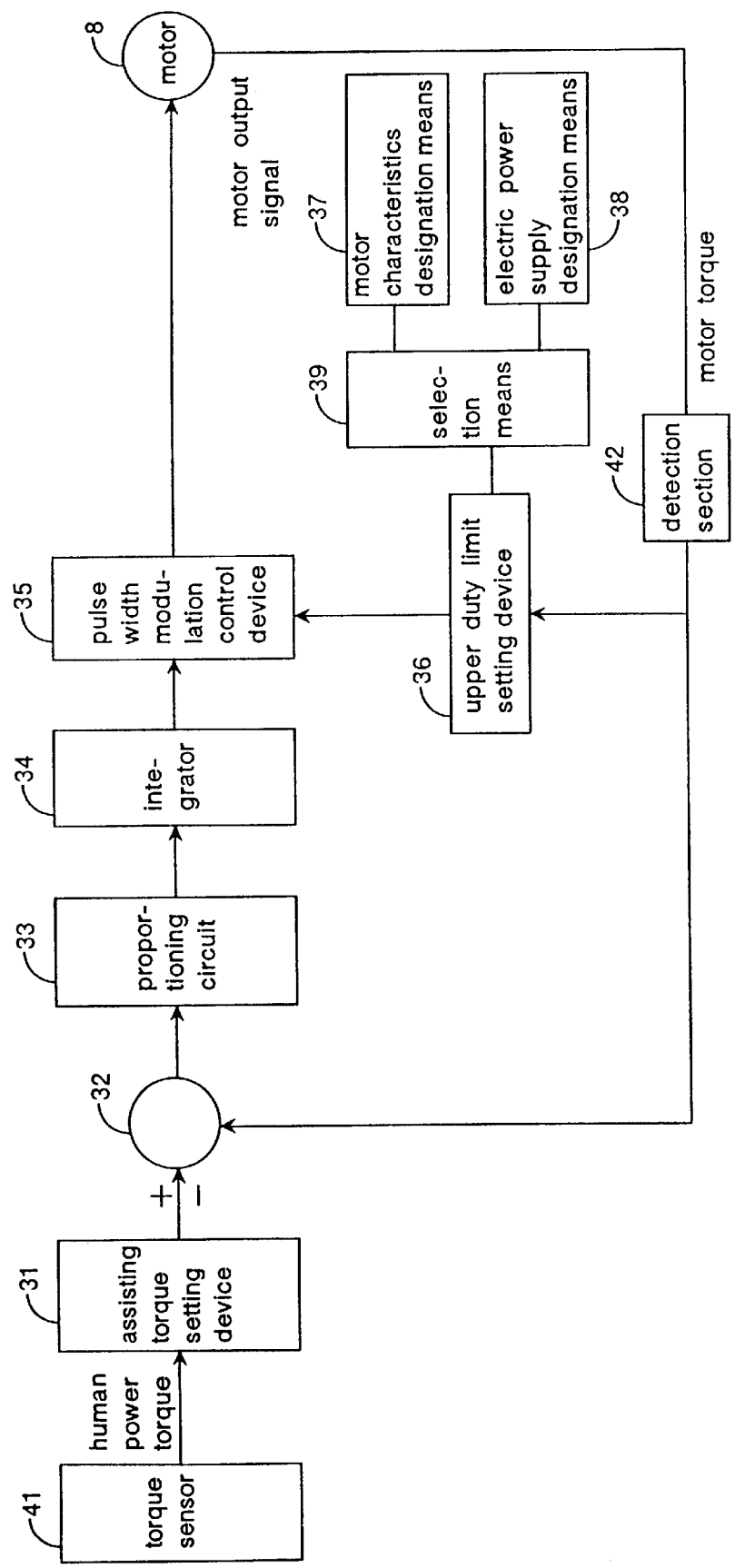
FIG. 15 is a diagram illustrating another embodiment of the torque limiting device for electrically driven vehicles according to the present invention.

Referring to FIG. 15, like members performing the same function as in the Example of FIG. 11 are represented by like numerals. The upper duty limit setting device 36 stores a plurality of tables showing the relationships between the motor torque and the upper duty limit of the pulse width modulation control as illustrated in FIG. 13. The duty of the pulse width modulation control device 35 is controlled by a duty corresponding to the motor torque signal. The reference numeral 37 represents a motor characteristics designation means, 38 a power supply voltage designation means, and 39 a selection means for the above two designation means. Although the torque limiting operation of this Example is basically the same as the one shown in FIG. 13, the selection means 39 is connected to the motor characteristics designation means 37 in the case where a plurality of motors having different characteristics are to be alternately used. This allows selection of a desired table corresponding to the predetermined motor characteristics from the plurality of tables which are stored in the upper duty limit setting device 36 and which show the relationships (A), (B), and (C) between the upper duty limit of the pulse width modulation control and the motor torque.

In the case where a plurality of power supplies having different voltages are to be used for one motor, the selection means 39 is connected to the power supply voltage designation means 38. This allows selection of a desired table corresponding to the predetermined power supply voltage from the plurality of tables which are stored in the upper duty limit setting device 36 and which show the relationships (A), (B), and (C) between the upper duty limit of the pulse width modulation control and the motor torque.

Further, in the case where a plurality of bicycle wheels are to be used, the driving of the motor can be controlled with a desired table if the size of the bicycle wheel to be used is set in a table before incorporating the control circuit. In the case where the sizes of the bicycle wheels are different, they correspond to (A), (B), and (C) in the order from the largest size.

The ordinary feedback control explained as above is carried out until the duty reaches its upper limit. However, if the motor torque attains the upper limit of the duty, the pulse width modulation control device 35 is restricted and controlled by the relationship shown in FIG. 13 with the upper duty limit being maintained as the maximum value.

As a result of this, the motor torque of the assisting motor 8 is suppressed so that the motor torque relative to the bicycle speed will have a relation shown in FIG. 14, satisfying the condition of the formula (5) that the torque curve lies in a region on the left side of the boundary line shown by the dotted line. Therefore, the motor output is appropriately controlled to satisfy the condition on the basis of the motor torque signal without detecting the rotation speed of the motor.

Although the above Example describes a case in which the same torque limiting device of the present invention is mounted onto three kinds of bicycles having wheels of different sizes, the torque limiting device can also be applied to a plurality of bicycles having different gear ratios determined by the front sprocket and the rear sprocket of the bicycle. Further, the torque limiting device can be applied to a bicycle in which a plurality of gear ratios are alternately used for driving the driving wheel.

Although the present invention has been described with reference to an example in which the torque of the assisting motor of an electric bicycle is limited, the present invention is not particularly limited to the torque limiting device for electric bicycles but can be applied as a speed limiter for stopping the rotation of the motor when the speed of an electric vehicle or the like exceeds a predetermined value. In such a case, the human power torque shown in the above Examples of FIGS. 11 and 15 can be replaced with an ordinary command torque, whereby the assist torque setting device will be unnecessary. The other operations are the same as in the above Examples.

As shown above, according to the present invention, the output torque of the motor for driving an electrically driven vehicle can be limited within a designated range without using a speed sensor in the case where specific motor characteristics and a specific power supply voltage are employed. Further, the output torque of the motor for driving an electrically driven vehicle can be limited within a designated safety range even in the case in which a plurality of motors having different characteristics are alternately used or in which a plurality of power supplies having different voltages (for example, batteries) are alternately used for one motor or in which the same torque limiting device of the present invention is mounted onto a plurality of bicycles having wheels of different sizes.

Also, since the output torque of the motor for driving an electrically assisted bicycle can be limited within a designated range without using a speed sensor, it is possible to prevent excessive and dangerous assistance in which the real output is too large and insufficient assistance in which the real output is too small when the speed determined by the speed sensor is different from the real speed as in the case where a conventional speed sensor is used.

Further, there will be a large freedom in the adjustment of the characteristics of the motor, the selection of the power supply (batteries), and the selection of the size of the wheels in an electrically assisted bicycle since the output torque of the motor for driving the electrically driven vehicle can be limited within a designated range even in the case in which a plurality of motors having different characteristics are alternately used or in which a plurality of power supplies having different voltages (for example, batteries) are alternately used for one motor or in which the same torque limiting device of the present invention is mounted onto a plurality of bicycles having wheels of different sizes.

What we claim is:

1. A torque limiting device for a motor in an electrically driven vehicle, comprising:

a control device for controlling an electric driving power supplied to the motor;

a detecting section for detecting a driven state of the motor and outputting an output signal thereof;

an upper electric driving power limit setting device in which a restricting value corresponding to the output signal from the detecting section is previously set; and a motor torque setting device in which a motor torque to be limited by the upper electric driving power limit setting device is previously set;

wherein the control device is operated on the basis of the output from the motor torque setting device, the output signal is a signal determined on the basis of the torque of the motor to be limited by the upper electric driving power limit setting device, and the upper electric driving power limit setting device gives a command to the control device to restrict an upper limit of the driving power on the basis of the restricting value when the output signal is outputted, thereby limiting the motor torque.

2. A torque limiting device according to claim 1, wherein the control device is a pulse width modulation control device.

3. A torque limiting device according to claim 1, wherein the upper electric driving power limit setting device is an upper duty limit setting device, whereby the electric driving power controlled by the control device is restricted on the basis of upper duty ratio limits which are the restricting values.

4. A torque limiting device according to claim 1, further comprising a power supply voltage designation means for designating a voltage of a power source of the electric driving power and the upper electric driving power limit setting device determines the upper limit of the electric driving power by means of the output signal and a designation signal from the power supply voltage designation means.

5. A torque limiting device according to claim 1, further comprising a motor characteristics designation means for designating characteristics of the motor and the upper electric driving power limit setting device determines the upper limit of the electric driving power by means of the output signal and a designation signal from the motor characteristics designation means.

6. A torque limiting device according to claim 1, wherein the upper electric driving power limit setting device determines the upper limit of the electric driving power in accordance with a size of a driving wheel of the electrically driven vehicle.

7. A torque limiting device according to claim 1, wherein the motor for the electrically driven vehicle is a motor of an electrically assisted bicycle in which a human driving power is assisted with a motor driving power.

8. A torque limiting device according to claim 7, wherein the upper electrical driving power limit setting device determines the upper limit of the electric driving power so that the assist ratio which is a ratio of the motor driving power to the human driving power lies within a restricted range.

* * * * *